United States Patent [19]

Strauss

[11] 4,055,403

[45] Oct. 25, 1977

[54] COMPRESSED AIR DRYER

[75] Inventor: Richard Strauss, Lexington, Mass.

[73] Assignee: Whatman Reeve Angel Limited, Maidstone, England

[21] Appl. No.: 705,910

[22] Filed: July 16, 1976

[51] Int. Cl.$^2$ ............................................. B01D 53/14
[52] U.S. Cl. ........................................... 55/31; 55/48; 55/51; 55/89; 55/316
[58] Field of Search ................... 55/31, 32, 46, 48, 51, 55/53, 89, 316, 387; 62/17; 210/232, DIG. 5

[56] References Cited

U.S. PATENT DOCUMENTS

| | | | |
|---|---|---|---|
| 2,859,260 | 11/1958 | Stiles | 210/DIG. 5 |
| 3,105,748 | 10/1963 | Stahl | 55/53 X |
| 3,182,434 | 5/1965 | Fryar | 55/53 X |
| 3,195,292 | 7/1965 | Skarstrom | 55/53 X |
| 3,464,186 | 9/1969 | Hankison et al. | 55/387 X |
| 3,616,598 | 11/1971 | Foral, Jr. | 55/32 |
| 3,767,054 | 10/1973 | Farrow et al. | 210/232 |
| 3,841,382 | 10/1974 | Gravis, et al. | 55/32 X |
| 3,975,172 | 8/1976 | Ranke | 55/51 X |

Primary Examiner—Thomas G. Wyse
Assistant Examiner—Robert H. Spitzer
Attorney, Agent, or Firm—Richard P. Crowley

[57] ABSTRACT

A compressed gas dryer and a method of drying compressed gas, particularly air, which method comprises: intimately contacting a high-pressure, wet, compressed gas stream having a high relative humidity with a hygroscopic liquid absorbent miscible with the water to be removed, and separating the liquid absorbent and compressed gas to provide a wet liquid-absorbent mixture containing the water removed from the gas and a dry compressed gas stream; reducing the liquid-absorbent mixture to a lower pressure than the high pressure of the wet compressed gas stream; intimately contacting the liquid-absorbent mixture with a portion of the dry compressed gas stream at the lower pressure and separating the liquid absorbent from the gas stream to provide a dry liquid absorbent and a lower-pressure gas stream containing the water removed from the liquid-absorbent mixture; recycling the dry liquid absorbent for use in the contacting of the wet compressed gas stream; removing the wet lower pressure gas stream at the lower pressure; and purging the wet lower-pressure gas stream to the atmosphere.

28 Claims, 2 Drawing Figures

COMPRESSED AIR DRYER

BACKGROUND OF THE INVENTION

A common commercial requirement is to dry a compressed gas, such as air, and in particular to lower the relative humidity of the gas so that, at a designated temperature, no moisture is condensed from the gas. It is so often desirable to lower the relative humidity of compressed air, for example, from an air compressor, so that there will be no water condensed, if the temperature is reduced to below 40° F; that is, the pressure dew point of the gas should be 40° F or lower.

The selection of a compressed air dryer and the common types of compressed air dryers available are described, for example, in *Plant Engineering* of Dec. 12, 1974, pp. 74–78, herein incorporated by reference. In general, three types of compressed air dryers are commonly used: deliquescent dryers, regenerative dessicant dryers (including heatless dryers); and refrigerated dryers. Although such dryers have various advantages, there is a need for a simple, low-maintenance, maximum-efficient, low-cost, self-controlled air dryer capable of operation at remote or hazardous locations by compressed air.

SUMMARY OF THE INVENTION

My invention relates to a compressed gas dryer and to a method of drying compressed gas. In particular, my invention concerns a compressed air dryer and system and a method of drying compressed air to a dew point of 40° F or below.

My method of drying a compressed gas, such as compressed air having a relative humidity, comprises contacting the wet compressed gas stream with a liquid absorbent in a single-absorption stage, but preferably a multiple-stage, gas-liquid, contacting apparatus to obtain a dry compressed gas stream, and a liquid-absorbent mixture containing the removed moisture; reducing the mixture to a lower pressure, preferably about atmospheric pressure; contacting the mixture with a dry gas stream at the lower pressure, preferably at least a portion of the dry gas stream from the absorption stage, which has been reduced in pressure to that of the mixture in a first-desorption-stage gas-liquid contacting apparatus; although a multiple-stage-desorption apparatus may be used, to obtain a dry liquid absorbent and a wet low-pressure gas stream containing the moisture removed from the liquid absorbent; and recycling the dry liquid absorbent to the first absorption stage for use in drying the wet compressed gas stream, while removing; e.g., by venting, the low-pressure wet gas stream.

In my method, preferably any entrained liquid absorbent in the dry compressed gas stream in the absorption stage is removed, such as by the use of a coalescing filter, and returned to the absorption stage. Typically, the liquid-absorbent mixture is introduced into the desorption stage by a pump, such as an air-driven pumpl e.g., a pump operated by the dry compressed gas stream. The liquid-absorbent mixture may be reduced in pressure in the desorption stage by a reducing valve, orifice or other means.

For the purpose of illustration and example only, my invention will be described in connection with drying compressed air; however, as will be apparent, my method and apparatus may be employed to dry any compressed gas where it is desired to remove moisture; for example, inert gases like argon, helium, neon, etc.; hydrocarbons such as methane, ethane, propane, ethylene, etc.; halocarbons like fluoro methanes and ethanes such as dimethyldifluoro methane; dielectric gases employed in electronics such as hexamethylene fluoride; oxides of nitrogen, sulfur and carbons like sulfur dioxide, nitrogen dioxide, carbon monoxide, carbon dioxide and other gases.

My invention employs a liquid absorbent, preferably a liquid which is hygroscopic and mixcible with the amount of water to be removed; that is, the liquid absorbent reduces the partial pressure of the water. Absorbents which are not miscible, or have limited miscibility with water or which form minimum boiling-point azeotropes with water, are undesirable. Preferably, the liquid absorbent must be easily separated from the water and have a high hydroscopic affinity for moisture.

A wide variety of liquid absorbents may be employed to include, but not be limited to, various alcohols, esters, ethers and other oxygenated organic liquids, such as polyalkylene glycols like the di and triethylene and propylene glycols, propylene glycol, ethylene glycol, ethanol, butylene glycol and other absorbents, such as tetramethyl urea, dimethyl sulfoxide, etc. The preferred solvent for availability, cost, viscosity and other factors is ethylene glycol.

The gas-liquid contactors useful in my invention may comprise single-stage contactors, but preferably multiple-stage gas-liquid contactors are most desired and preferred. Although the absorption and desorption steps may be carried out in absorption and desorption means, such as countercurrent towers with sieves, plates, packings and the like, contactor means with provide good contact between a small volume of the liquid absorbent and a large volume of gas are preferred and most desired. Particular and unique gas-liquid contactors suitable for use in my invention will be described in particular. In my description, each stage is one theoretical plate in an absorption-desorption tower. Each stage requires the inimate mixing of the liquid absorbent and gas and the separation of the mixed gas and liquid. Normally multiple stages are obtained in gas-liquid contacting towers with plates or packings; however, where there is a limited amount of liquid and a large volume of gas, the use of wholly conventional gas-liquid-contacting means is difficult, since there is not enough liquid to achieve multiple stages. My apparatus and system employ a unique multistage contactor particularly suitable for mixing small amounts of the liquid absorbent with large volumes of gas. In particular, my apparatus comprises the combination of a venturi device with a coalescing device.

My apparatus for the drying of a compressed gas, such as air, comprises: at least one and preferably two, three or more absorption stages to provide for the intimate mixing of a small volume of liquid absorbent with a large volume of gas; for example, a venturi-mixing device, and a coalescing filter in each stage; and a desorption means to dry at a lower pressure the liquid absorbent mixture by the use of a portion of the compressed dry gas stream from one of the absorption stages, and to remove or vent a wet gas stream.

The coalescing means used in my invention may vary, but typically is a supported or unsupported filter tube of defined porosity and properties to entrain any particles of liquid absorbent in the dry compressed gas of each stage, and to coalesce the particles on the filter and in a filter housing or reservoir. A conventional coalescing filter would include, for example, and external housing and a nonwoven, semirigid, self-supporting, glass-fiber filter tube, the glass fibers having an average diameter of about 0.03 to 9 microns and bonded together with a binding agent, particularly a hydrophobic agent, such as a hardened resin like an epoxy resin, as described in U.S. Pat. No. 3,767,054, issued Oct. 23, 1973, herein incorporated by reference.

My invention will be described for the purpose of illustration only in certain preferred embodiments; however, it is recognized that various changes and modifications can be made in the illustrated embodiments without departing from the spirit and scope of my invention.

DESCRIPTION OF THE EMBODIMENTS

Figure 1:
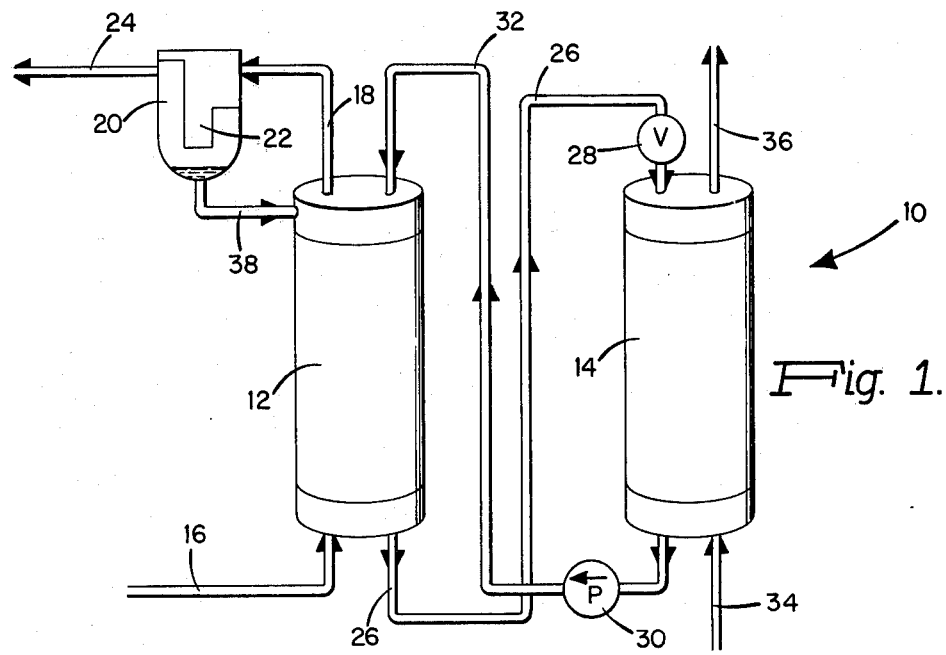
FIG. 1 is a schematic illustration of a compressed gas dryer of my invention.

My compressed gas dryer 10 comprises an absorption tower 12 having a liquid absorbent therein, and a desorption tower 14, an inlet conduit 16 to introduce wet compressed air into tower 12, an outlet conduit 18 to remove dry compressed air, a coalescing filter assembly of an external housing 20 with a filter tube 22 to remove entrained liquid absorbent from the dry compressed air stream, a conduit 38 to return coalesced absorbent to tower 12 and a recovery conduit 24 to recover or remove a dry compressed air stream for use as desired. The desorption tower 14, having a liquid absorbent mixture therein, includes conduit 26 by which wet absorbent liquid from absorption tower 12 is introduced via reducing valve 28 to desorption tower 14, a conduit 34 to introduce a dry air at low pressure into the tower 14, a conduit 36 to vent wet air to the atmosphere, and a pump 30, preferably air-driven, to return a dry absorbent liquid by conduit 32 to tower 12.

In operation, compressed gas, such as air at high relative humidity (RH) is introduced into the bottom countercurrent absorption tower 12 via 16, and is dried by contact with a dry hygroscopic liquid like ethylene glycol. A dry compressed air stream is removed via 18 and entrained liquid absorbent removed by the coalescing filter 22, with collected absorbent in housing 22 returned to the tower 12 by conduit 38 and dry compressed gas recovered via 24. The absorbent liquid mixture containing the water removed is withdrawn via 26 and is reduced in pressure by reducing valve 28 typically to about atmospheric pressure, and is introduced into countercurrent desorption tower 14. The liquid absorbent mixture is dried by countercurrent contact and mixed with relatively dry air, usually a portion of the dry compressed air, from conduit 24, is reduced in pressure and introduced via 34 into the bottom of tower 14. The drying gas or air may also be a mixture of dried and undried compressed air or gas reduced to atmospheric pressure. The wet gas or air is vented to the atmosphere via 36, while the dry liquid absorbent is returned to tower 12 for use therein via conduit 26 and pump 30, preferably, where the dryer is at a remote location, an air-driven pump, operated by a portion of the dry compressed air from conduit 24.

The utilitiy of my method depends on the fact that the amount of water vapor which can be retained by a unit weight of air or other gas is inversely proportional to the absolute pressure of the gas. For example, air at atmospheric pressure will hold 7.8 times the weight of water per pound of air, as will air at 100 psig and the same temperature. Conversely, air at 100 psig, which is saturated with respect to water vapor, will have a relatively humidity of only 12.8% when reduced to atmospheric pressure at the same temperature. The method which is the subject of my invention relies on the differential water-holding capacities by absorbing water from the compressed air and desorbing water into air at essentially atmospheric pressure. Since the water-holding capacity of the low-pressure air is several times as high as the capacity of the compressed air, only a small portion of the dried compressed air need be used for desorption.

The efficiency of my method is defined by the ratio of usable dried air to dried air which is required for desorption, and increases with increasing air pressure and decreases with decreasing pressure. Although it is theoretically possible to operate the process with air at any pressure above atmospheric, below about 20 psig air pressure, the method is uneconomic because an excessive proportion of the dried air is required for desorption.

For the purpose of describing my method in detail, it is assumed that the compressed gas is air, the absorbent is ethylene glycol, and the air pressure is 100 psig. The method is, of course, useful for other gases, with other liquid absorbents and other gas pressures as set forth. A common commercial requirement is to lower the relative humidity of compressed air so that there will be no further water condensation if the temperature is reduced to 40° F (that is, the pressure dew point of the air should be 40° F or lower). If the compressed air is at 100 psig, 90° F and 100% RH, the water content of the air must be reduced from 0.378 wt % to 0.066 wt % to achieve the desired dew point reduction. If a true theoretical countercurrent extraction of the water into the glycol is assumed in FIG. 1, the glycol can enter the top of the tower at 5.78 wt % water and leave at virtually 100% water, since the air entering the tower is at 100% RH. Under these conditions, the glycol-air flow ratio would be only about 1/300, or for an air flow of 20 SCFM, glycol flow would be 0.3 lb per hour. It is difficult to approach the true theoretical countercurrent extraction conditions, since to scrub water from a large volume of air with a very small quantity of liquid presents physical problems.

It is possible to achieve efficient contacting of a small quantity of liquid with a large volume of gas by recirculating the liquid at a rapid rate through the gas; for example, by pumping it continuously through a spray head at the top of an air chamber; e.g., from a reservoir at the bottom of the air chamber, while flowing liquid through the reservoir at a very low net rate. This system, however, does not give the advantage of countercurrent flow of liquid and air, since the air is in equilibrium with the liquid leaving the chamber, rather than with the liquid entering the chamber, as in the countercurrent flow situation. Thus, single-stage extraction is theoretically much less efficient than countercurrent extraction. For example, to achieve the desired 40° F dew point in a single-stage extraction starting with saturated air at 90° F and 100 psig, it would be necessary to use about half the dried compressed air to regenerate the glycol, even assuming true countercurrent regeneration.

Figure 2:
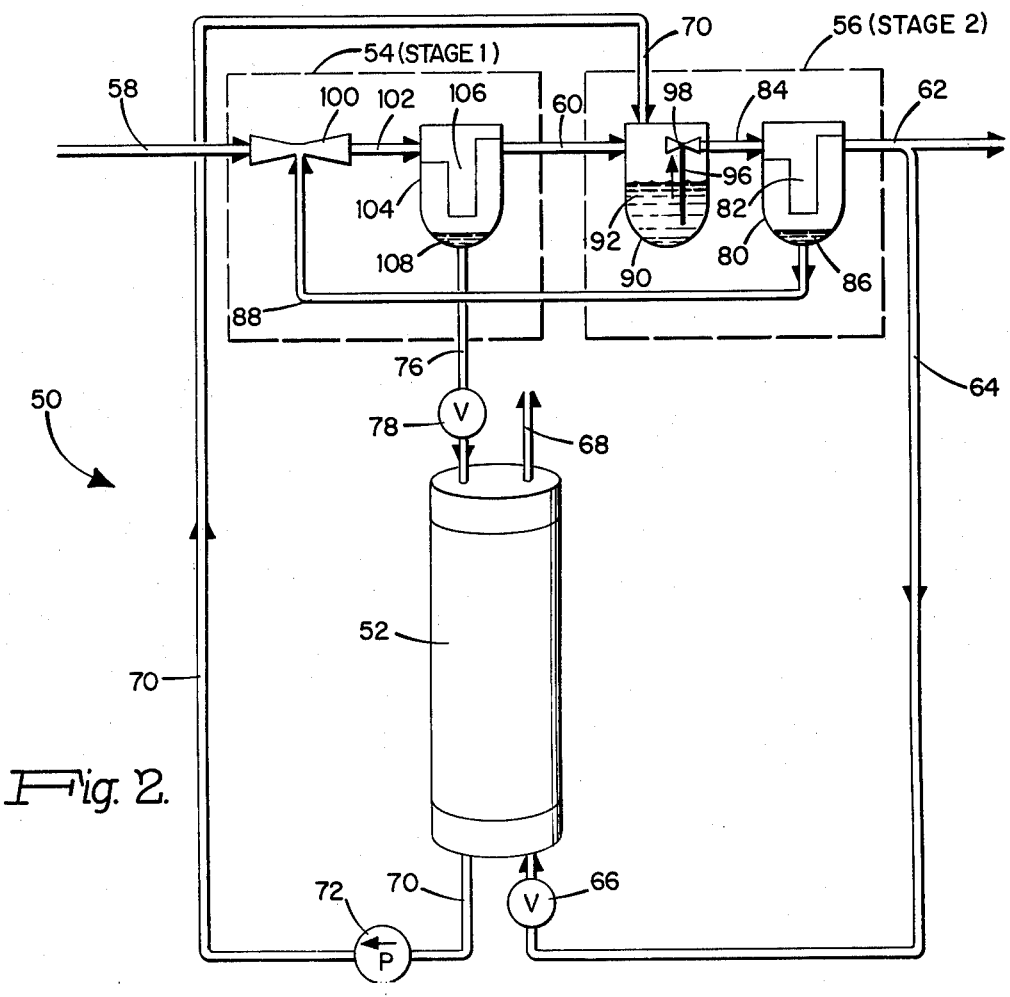
FIG. 2 is a schematic illustration of a two-stage compressed gas dryer of my invention.

The optimum method of my invention is a multistage extraction with complete mixing within each stage and countercurrent flow of air and glycol between stages. A schematic two-stage countercurrent system is shown in FIG. 2. The regeneration system, shown in FIG. 2, is a countercurrent extractor, since the glycol-air-weight ratio is considerably higher than during absorption, and the atmospheric pressure operation permits design of efficient and low-cost countercurrent contactors.

FIG. 2 is a schematic illustration of a two-stage compressed air dryer system 50 which comprises a description tower 52 with first absorption stage 54 and second absorption stage 56 (both shown on dotted lines. Compressed air is introduced via 58 through a venturi tube mixer 100, via 100 to a coalescing filter assembly with housing 104, filter 106 and recovered liquid absorbent 108 shown in the housing. Dry compressed air is removed from stage 54 via 60 to stage 56 to a reservoir 90 (a lubricator assembly) with a venturi tube 98, with mixing tube 96 in a reservoir of liquid absorbent 92. The dry compressed air from the reservoir 90 is removed via 84 to a coalescing filter assembly with housing 80, coalescing filter 82 with coalesced liquid absorbent 86 in the housing 80 removed via mixing tube 88 by venturi tube 58, and dry compressed air removed via 62. Wet absorbent liquid; that is, the mixture, is removed from stage 56 to stage 54 and removed via 76 through reducing valve 78 to tower 52. Dry absorbent liquid is removed from tower 52 via 70 and pump 72 to stage 56, while wet air is vented to atmosphere via 68. A portion of the dry air from 62 is recycled via 64 through reducing valve 66 to tower 52.

With the flow diagram as shown in FIG. 2, the following conditions are achieved:

Air in: 100 psig, 90° F, 100% RH (Dew Point 90° F)
Air out: 100 psig, 90° F, (Dew Point 38° F)
Air Flow: 25.5 SCFM
Usable dry air: 20 SCFM
Dry air used for regeneration: 5.5 SCFM
Glycol recirculation rate: 5.25 lbs per hour Using the same inlet air conditions, the following alternative operating conditions can be achieved with two-stage countercurrent operation:

| Dew Point, Dried Air | Flow Rate, Usable Dry Air | Flow Rate, Air Used for Regeneration |
| --- | --- | --- |
| 68° F | 20 SCFM | 2.0 SCFM |
| 49° F | 20 SCFM | 4.1 SCFM |
| 32° F | 20 SCFM | 6.6 SCFM |
| 27° F | 20 SCFM | 7.6 SCFM |

Additional contact stages with countercurrent flow will increase the efficiency of the process, but at the expense of added investment and complexity. For example, the following results are achieved with three-stage countercurrent operation:

| Dew Point, Dried Air | Flow Rate, Usable Dry Air | Flow Rate, Air Used for Regeneration |
| --- | --- | --- |
| 68° F | 20 SCFM | 1.8 SCFM |
| 49° F | 20 SCFM | 3.2 SCFM |
| 38° F | 20 SCFM | 4.0 SCFM |
| 32° F | 20 SCFM | 4.6 SCFM |
| 27° F | 20 SCFM | 5.1 SCFM |

Compared with two-stage operation, three-stage operation gives better air utilization, particularly in the low-dew-point range. More importantly from a commercial standpoint is the fact that lower dew points are more practical with three-stage operation than with two-stage. Additional stages beyond three stages will, of course, increase air efficiency still further or permit achieving lower dew points. It should be noted that extremely low dew points, for example, to −40° F, can be achieved in practice with my method with a multiple number of contact stages. By comparison, a refrigerated dryer is limited to about 36° F dew point in practice, because it cannot approach the freezing point of water. My invention has no such limitation.

In the preferred embodiment, it is necessary to use contact stages which provide intimate contact between a small volume of liquid and a large volume of gas, followed by efficient separation of the liquid and gas so that true countercurrent flow between stages can be achieved. Various types of contactors known in gas-liquid absorption operations may be used, including recirculating the liquid with a pump through a sprayer, spinning disc or spinning vane contactor, with the compressed air acting as the motive force, and a saturated pad contactor.

A type of contactor which is uniquely suited to my method is exemplified in FIG. 2 by the well-known oil lubricators designed for use with compressed air. A lubricator is relatively inexpensive and is designed to meter a small quantity of oil into air and disperse the oil in microdroplet form. It consists of an oil reservoir, a dip tube, and a venturi mixing device at the top of the dip tube. The oil rises in the dip tube as a result of the reduced pressure at the throat of the venturi caused by air flow. The pressure differential is proportional to air flow, and, therefore, the oil flow rate is proportional to air flow over a fairly wide range. The ratio of oil to air can be adjusted to some extent by a needle valve, but generally the lubricator is designed to disperse a relatively small quantity of oil into the air.

For the purpose of my invention, feeding ethylene glycol (or other water absorbent) into the air with a lubricator assembly as shown in FIG. 2 in combination with a coalescing assembly and then removing the glycol in a coalescing filter constitutes an effective, simple and inexpensive single-stage pressure contactor. Several sets of lubricators and filters in series constitute a multiple-stage contactor. However, to achieve countercurrent flow, it is necessary to provide a means for the glycol collected at each filter to flow to the lubricator which is adjacent to it upstream; that is, the glycol must flow from a lower-pressure filter to a higher-pressure lubricator. The desired flow can be achieved by pumping by any pumping means. A simpler and less expensive method is to use the venturi action of the lubricator as a pump, as well as a liquid dispersion device. As shown in FIG. 2, the liquid 86 coalesced by the filter 82 in the second stage 56 can be drawn from the bowl of the filter by the venturi 100, and, therefore, the entire absorption section operates solely on the force of the compressed air, with no external energy source required.

The only energy input needed for my entire dryer system is the pump to return glycol from the low-pressure regenerator tower 52 to the high-pressure absorbers 54 and 56. Since the net glycol flow rate will be quite low compared with the air flow rate, the pump 72 can be air-driven. A convenient source of high-pressure air is the dried bleed air which is used to regenerate the glycol. Since this air must be reduced to atmospheric pressure in any case, using a portion of it to drive the pump will not increase the net energy requirements of the process.

My invention may be so designed so that an external source of energy is not required, other than the energy in the compressed air to be dried. This is extremely advantageous when the dryer must be located in a hazardous area or a remote and inaccessible area. In addition, my method is inherently self-controlled; that is, it starts and stops as the air flow starts and stops, and all internal flows are automatically proportional to air flow.

The method of my invention resembles a deliquescent dryer in that a water-absorbent solution is used to reduce the RH of the air. However, compared with a deliquescent dryer, the advantage of my method is that the absorbent solution is continuously regenerated, and, therefore, the absorbent can be selected for maximum efficiency, rather than minimum cost. My method avoids the disadvantages of the deliquescent dryer, as stated in the article (supra) (limited dew point suppression, desiccant must be replaced periodically, high maintenance, limited operating temperature range because of caking or freezing of the desiccant), while maintaining all the advantages: low initial cost, simplicity and few moving parts.

Compared with a desiccant dryer, my method gives the same excellent dew point reduction, but with a much simpler and less costly operation. Desiccant dryers tend to be high-maintenance items, because the controls and valving for periodic cycling between absorption and regeneration are costly and subject to breakdown. In addition, the solid desiccant itself is fragile and sensitive to impurities in the air and to mechanical shock, requiring replacement periodically and often causing serious problems by migrating downstream with the dried air. My method and apparatus have none of these disadvantages. As compared with a refrigerated dryer, my method is similar in that it is noncycling; however, my method will give lower dew points (a refrigerated dryer is limited to about 36° F dew point), much lower investment, and lower operating costs. In addition, my apparatus is inherently explosion-proof and does not require external electrical connections.

Therefore, my compressed gas dryer and method are unique and have numerous advantages over those compressed gas dryers of the prior art.

What I claim is:

1. A method of drying a compressed gas stream, which method comprises:
   a. intimately contacting a large volume of a high-pressure, wet, compressed gas stream having a high relative humidity with a small amount of a hygroscopic liquid absorbent miscible with the water to be removed by dispersing the liquid absorbent in microdroplet form into the compressed gas stream, and separating the liquid absorbent and compressed gas by coalescing the entrained microdroplets of the liquid absorbent, to provide a wet liquid-absorbent mixture containing the water removed from the gas and a dry compressed gas stream;
   b. reducing the liquid-absorbent mixture to a lower pressure than the high pressure of the wet compressed gas stream;
   c. intimately contacting the liquid-absorbent mixture with a portion of the dry compressed gas stream at the lower pressure, and separating the liquid absorbent from the gas stream to provide a dry liquid absorbent and a lower-pressure gas stream containing the water removed from the liquid-absorbent mixture;
   d. recycling the dry liquid absorbent for use in the contacting of the wet compressed gas stream;
   e. removing the wet lower-pressure gas stream at the lower pressure; and
   f. recovering a dry compressed gas stream.

2. The method of claim 1 which includes coalescing entrained liquid absorbent from the dry gas stream by passing the dry gas stream through a coalescing filter, and recycling the coalesced absorbent for use.

3. The method of claim 1 wherein the liquid absorbent is a polyhydric alcohol.

4. The method of claim 3 wherein the alcohol is ethylene glycol.

5. The method of claim 1 wherein the lower pressure is about atmospheric pressure.

6. The method of claim 1 wherein the compressed gas stream is a compressed air stream.

7. The method of claim 1 wherein recycling of the dry liquid absorbent is by an air-driven recycling pump.

8. The method of claim 7 which includes driving the recycling pump by a portion of the dry compressed gas stream.

9. The method of claim 1 wherein the compressed gas stream has a pressure greater than about 20 psig.

10. The method of claim 1 wherein the dry recovered compressed gas stream has a dew point of about 40° F or lower.

11. The method of claim 1 which includes in a first-absorption stage:
    a. intimately contacting the wet compressed gas stream and the liquid absorbent in a venturi mixing tube; and
    b. separating the mixed liquid absorbent and gas stream by coalescing the entrained liquid absorbent from the venturi-mixing tube to provide a dry compressed gas stream and coalesced liquid absorbent.

12. The method of claim 11 where dry compressed gas from the first stage is contacted and separated as in the first stage in a second or more stages to obtain a dry compressed gas stream which is recovered and wherein the liquid absorbent coalesced in the second or higher stage is recycled for use in the venturi-mixing tube of a lower stage.

13. The method of claim 11 where the coalesced liquid absorbent of the first stage is recyled for contact with a portion of the dry compressed gas stream at the lower pressure.

14. The method of claim 11 wherein coalescing of the entrained liquid absorbent includes passing the compressed gas stream with the entrained liquid absorbent through a nonwoven, bonded, glass-fiber filtertube, the tube having a diameter of from about 0.001 to 10 microns.

15. The method of claim 11 which includes:
    a. passing the wet compressed gas stream through a first venturi tube in a first absorption-contacting stage to cntact and mix the gas stream and dry liquid absorbent to obtain a dry compressed gas stream;
    b. coalescing the liquid absorbent entrained in the dry compressed gas stream from the first venturi tube in a first coalescer to obtain a first coalesced liquid-absorbent;
    c. recycling the first coalesced liquid absorbent for contacting with a portion of the dry compressed gas stream at a lower pressure.

d. passing the dry compressed gas stream from the first coalescer through a second venturi tube, in a second absorption contacting stage, to contact and mix the first dry compressed gas stream and liquid absorbent and to obtain a second dry compressed gas stream.

e. coalescing the liquid absorbent entrained in the second dry compressed air stream from the second venturi tube in a second coalescer to obtain a second coalesced liquid absorbent; and f. passing the liquid absorbent from the second coalescer into the first venturi tube to mix with the wet compressed gas stream.

16. The method of claim 1 which includes contacting intimately the wet compressed gas or the dry compressed gas stream with the liquid absorbent by mixing in a venturi tube, and recycling the liquid absorbent by the pumping action of the venturi tube.

17. The method of claim 16 wherein the venturi-mixing means also recycles the separated liquid absorbent at the lower pressure to contact the wet compressed gas stream at the higher pressure.

18. The method of claim 1 wherein the large volume of dry compressed gas stream is mixed intimately with a small volume of the liquid absorbent in successive separate mixing and coalescing stages, and wherein the liquid absorbent separated in one stage is recycled for use in the next lower stage, the flow of absorbent and gas countercurrent in each stage, to provide a gas of the desired humidity.

19. A method of drying a compressed air stream, which method comprises:
 a. passing a wet compressed air stream having a pressure of greater than about 20 psig through a first venturi tube to mix the compressed air with a liquid absorbent for the moisture in the stream;
 b. coalescing entrained liquid absorbent in the compressed air stream from the first venturi tube in a first coalescer to provide a first coalesced liquid absorbent;
 c. passing the compressed air stream from the first coalescer through a second venturi tube to mix the compressed air stream with a liquid absorbent;
 d. coalescing entrained liquid absorbent in the compressed air stream from the second venturi in a second coalescer to provide a second coalesced liquid absorbent;
 e. directing the second coalesced liquid absorbent into the first venturi to mix with the compressed air passing through the first venturi tube;
 f. removing a dry compressed air stream from the second coalescer having a dew point of 40° F or lower;
 g. reducing the pressure of the first liquid absorbent to about atmospheric pressure;
 h. contacting the liquid absorbent at atmospheric pressure with a portion of the removed dry compressed air stream reduced to about atmospheric pressure to remove the moisture from the liquid absorbent to provide a dry liquid absorbent and a wet atmospheric-pressure air stream;
 i. discharging the wet air stream to the atmosphere; and
 j. recycling the dry liquid absorbent with an air-driven pump to contact and mix with the dry compressed air in the second venturi tube, the pump driven by a portion of the removed dry compressed air stream.

20. The method of claim 19 wherein the liquid absorbent is ethylene glycol.

21. A compressed gas dryer which comprises:
 a. venturi-mixing means to contact intimately by dispersion a large volume of a high-pressure, wet, compressed gas stream having a high relative humidity with a small volume of a hygroscopic liquid absorbent miscible with the water to be removed, to disperse the liquid absorbent in microdroplet form in the gas stream, and means to separate the liquid absorbent and compressed gas by coalescence, to provide a wet liquid-absorbent mixture containing the water removed from the gas and a dry compressed gas stream;
 b. means to reduce the liquid-absorbent mixture to a lower pressure than the high pressure of the wet compressed gas stream;
 c. means to contact intimately the liquid-absorbent mixture with a portion of the dry compressed gas stream at the lower pressure, and means to separate the liquid absorbent from the gas stream, to provide a dry liquid absorbent and a lower-pressure gas stream containing the water removed from the liquid-absorbent mixture;
 d. means to recycle the dry liquid absorbent for use in the contacting of the wet compressed gas stream;
 e. means to remove the wet lower-pressure gas stream at the lower pressure; and
 f. means to recover a dry compressed gas stream.

22. The dryer of claim 21 wherein the recycling means comprises an air-driven pump driven by a portion of the dry compressed gas.

23. The dryer of claim 21 wherein the liquid absorbent comprises a glycol.

24. A compressed air dryer which comprises:
 a. a first absorption means which comprises:
  i. a first venturi mixing tube; and
  ii. first coalescing means whereby a wet compressed air stream is passed through the venturi tube and mixed with a liquid absorbent and entrained liquid absorbent from the air stream from the first venturi is coalesced in the first coalescing means;
 b. a second absorption means which comprises:
  i. a second venturi mixing tube;
  ii. a source of liquid absorbent; and
  iii. a second coalescing means whereby the compressed air from the first coalescer is passed through the second venturi and mixed with liquid absorbent from the source of liquid absorbent and entrained liquid absorbent is coalesced in the second coalescing means.
 c. means to introduce liquid absorbent from the second coalescing means to the fist venturi mixing tube, whereby the liquid absorbent is mixed with the wet compressed air stream.
 d. means to recover a dry compressed gas from the second coalescing means;
 e. a desorption means to contact and mix wet liquid absorbent with a dry compressed air stream at a lower pressure;
 f. means to recycle wet liquid absorbent from the first coalescing means to the absorption means;
 g. means to reduce the pressure of the wet liquid absorbent recycled to the desorption means;
 h. means to introduce a portion of the dry compressed air from the means to recover into the desorption means at a lower pressure;

i. means to discharge a wet air stream from the desorption means; and
j. means to recycle dry liquid absorbent from the desorption means to the source of liquid absorbent in the second absorbent means.

25. The dryer of claim 24 where the coalescing means comprises a coalescing filter composed of nonwoven bonded glass fibers.

26. The dryer of claim 24 where the means to recycle the wet liquid absorbent includes a gas-driven pump and means to recycle a portion of the dry compressed air to drive the pump.

27. The dryer of claim 24 wherein the liquid absorbent comprises an alcohol or a polyhydric alcohol.

28. The dryer of claim 24 which includes a plurality of three or more absorption means to provide compressed air of the desired humidity.

* * * * *